United States Patent [19]
Pollman et al.

[11] Patent Number: 5,682,287
[45] Date of Patent: Oct. 28, 1997

[54] DIGITAL CIRCUIT INTERRUPTER SHUNT TRIP ACCESSORY MODULE

[75] Inventors: John Allen Pollman, Seymour; Paul Hamilton Singer, Hartford; Esteban Santos, Windsor, all of Conn.

[73] Assignee: General Electric Company, New York, N.Y.

[21] Appl. No.: 585,652

[22] Filed: Jan. 16, 1996

Related U.S. Application Data

[63] Continuation-in-part of Ser. No. 247,198, May 20, 1994, abandoned.

[51] Int. Cl.[6] .................................................... H02H 3/00
[52] U.S. Cl. ............................ 361/93; 365/98; 365/87
[58] Field of Search ............................ 361/93–98, 87

[56] References Cited

U.S. PATENT DOCUMENTS

| | | | |
|---|---|---|---|
| 3,654,519 | 4/1972 | South | 361/96 |
| 4,024,437 | 5/1977 | Suzuki | 361/87 |
| 4,672,501 | 6/1987 | Bilac et al. | 361/96 |
| 4,833,563 | 5/1989 | Russell | 361/92 |
| 4,870,531 | 9/1989 | Danek | 361/93 |

*Primary Examiner*—Jeffrey A. Gaffin
*Assistant Examiner*—Sally C. Medley
*Attorney, Agent, or Firm*—Richard A. Menelly; Carl B. Horton

[57] ABSTRACT

An integrated circuit breaker is described having shunt trip capability along with automatic overcurrent protection through the circuit breaker trip unit and shunt trip module. The shunt trip module further provides auxiliary power to the trip unit and allows the trip unit microprocessor to report and record the shunt trip operation.

17 Claims, 4 Drawing Sheets

DIGITAL CIRCUIT INTERRUPTER SHUNT TRIP ACCESSORY MODULE

This is a continuation-in-part of application Ser. No. 08/247,198 filed on May 20, 1994 now abandoned.

BACKGROUND OF THE INVENTION

U.S. Pat. No. 4,672,501 entitled "Circuit Breaker and Protective Relay Unit" describes the use of a digital circuit interrupter employing a microprocessor in combination with ROM and RAM memory elements to provide both relaying as well as protection function to an electrical distribution system.

U.S. Pat. No. 4,833,563 entitled "Molded Case Circuit Breaker Actuator-Accessory Module" describes an integrated protection unit that includes basic overcurrent protection facility along with selective electrical accessories. A specific actuator-accessory module is selected to give the required accessory function along with basic overcurrent protection. This patent supplies a separate shunt trip signal directly to the actuator-accessory module without connection to the circuit breaker trip unit circuit.

In those arrangements wherein a plurality of electronic circuit breakers communicate within an electrical distribution system, it would be advantageous to announce the shunt trip operation of one of the circuit breakers to the other circuit breakers within the system. However, after a shunt trip operation, the circuit breaker trip unit no longer receives operational power from the electrical distribution system and hence loses ability to display or communicate the occurrence of the shunt trip operation to interrupt the circuit current.

The subject invention proposes a shunt trip interrupter module that interacts with the circuit breaker trip unit to provide shunt trip circuit interruption as well as to continue to supply operating power to the trip unit to allow the trip unit to communicate and display the shunt trip operation.

SUMMARY OF THE INVENTION

An integrated circuit breaker is described having shunt trip capability along with automatic overcurrent protection. An independent shunt trip module supplies a shunt trip voltage signal, hereafter "STVS" to the circuit breaker trip unit to interrupt circuit current and continues to apply the STVS to provide auxiliary power to the trip unit to allow the trip unit microprocessor to display and record the shunt trip operation.

DESCRIPTION OF THE PREFERRED EMBODIMENT

Figure 1:
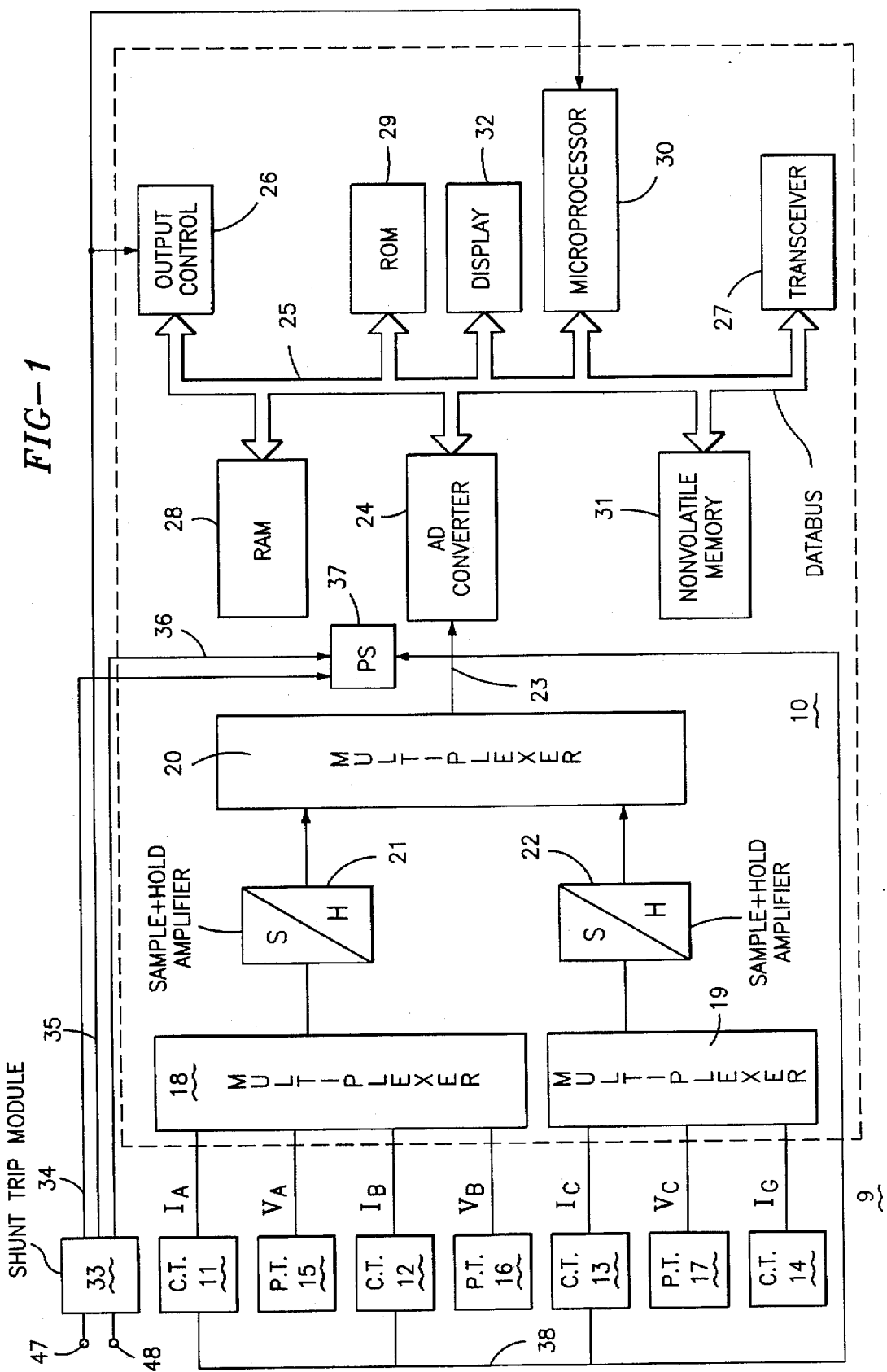
FIG. 1 is a schematic representation of a digital circuit interrupter that includes the shunt trip module according to the invention.

As described within the aforementioned U.S. Pat. No. 4,672,501 a circuit breaker controller 9 such as depicted in FIG. 1 is contained on a printed circuit card 10 to which external connection is made with current transformers 11–14 and potential transformers 15–17. The electrical input is transmitted through multiplexers 20 and sample and hold amplifiers 21,22 to an A/D converter 24 by means of conductor 23. Circuit protection and control is achieved by utilization of a data bus 25 which is interconnected with an output control 26, transceiver 27, and RAM 28. The ROM 29, microprocessor 30 and nonvolatile memory 31 operate in the manner described therein to insure complete overall circuit protection. The information as to the status of the circuit breaker contacts (not shown) that are controlled by the output control 26 is displayed on the display 58 that is similar to that described in U.S. Pat. No. 4,870,531 entitled "Circuit Breaker removable Display and Keyboard". Operating power to the printed circuit card 10 is supplied by the current transformers 11–14 from the associated electrical distribution system. In accordance with the invention, shunt trip facility is provided by connection of a shunt trip module 33 with the microprocessor 30, output control 26 and the trip unit power supply 37 by means of conductors 34, 35 and 36. For purposes of this disclosure, the term "shunt trip" is defined as the provision of a trip signal to the circuit breaker trip unit independent of the circuit breaker trip unit which otherwise determines a trip operation based on the occurance of an overcurrent condition. The shunt trip signal is often supplied by an operator remote from the circuit breaker location to either test the circuit breaker operating components or to electrically disconnect the associated electrical equipment for replacement or repair. Operating power to the trip unit power supply is provided by the current transformers 11–13 over conductor 38 when the associated electrical distribution system is operational. Upon the provision of a shunt trip signal, the circuit breaker trip unit is disconnected from the electrical distributiion circuit and hence, becomes inactive. To maintain operating power to the trip unit, in accordance with the invention, operating power is supplied by the shunt trip module to the trip unit circuit by continued application of the shunt trip voltage signal, hereafter "STVS" over input terminals 47, 48 to the output control circuit 26 after the associated electrical distribution circuit has been interrupted. The occurrence of the shunt trip interruption is transmitted to the microprocessor for storage and display.

Figure 2:
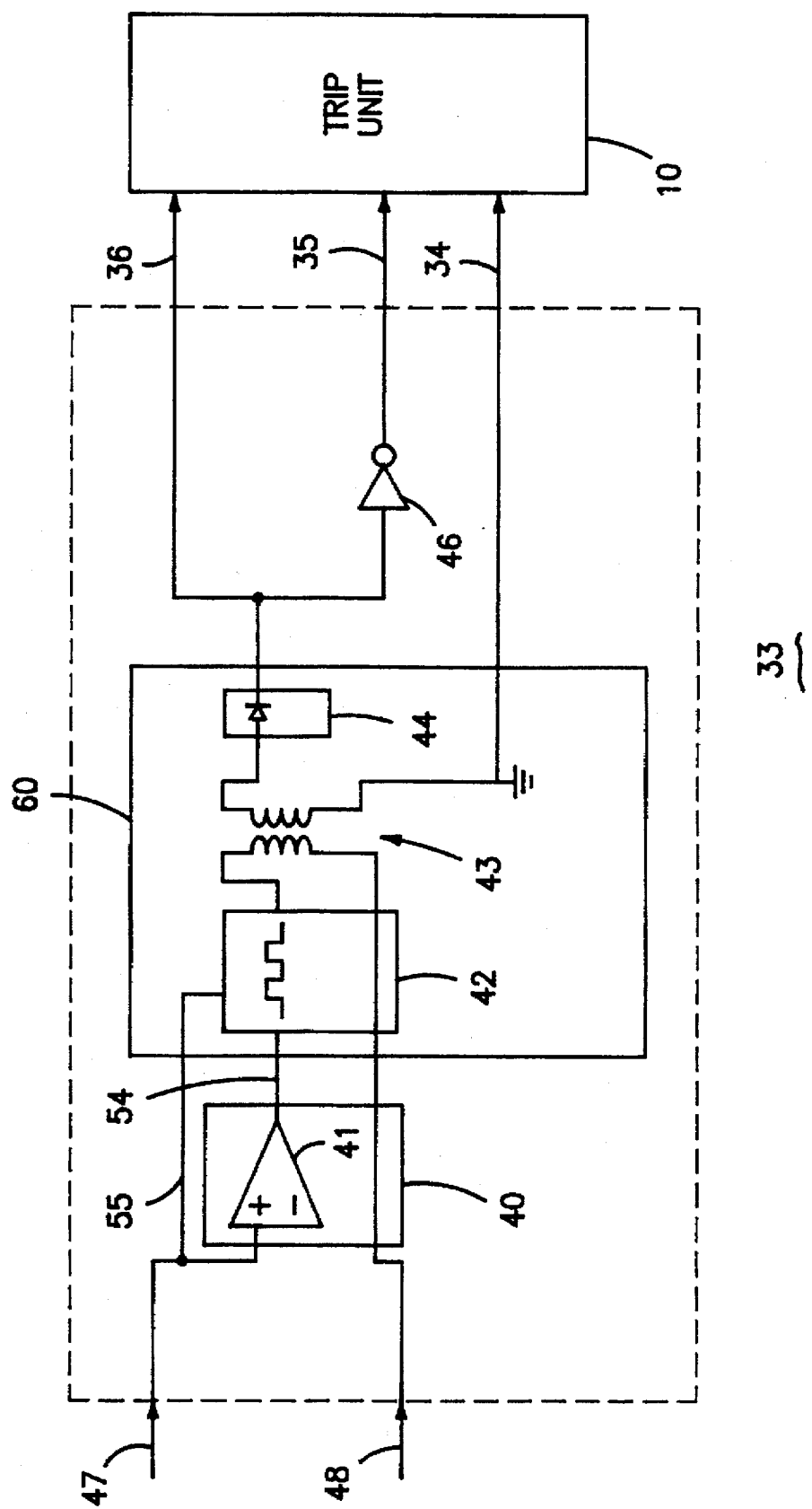
FIG. 2 is an enlarged diagrammatic representation of the components within the shunt trip module of FIG. 1.

The functional components of the shunt trip module 33 are depicted in FIG. 2. The STVS supplied to inputs 47, 48 is inputted to the comparator circuit 40 for evaluation within a comparator logic device generally depicted as 41 and thence over conductors 54, 55 to a conditioning circuit 60 which contains a pulse generator 42, transformer 43 and rectifier diode 44. The output from the conditioning circuit 60 is transmitted directly to the trip unit 10 over conductors 34, 36 and through an inverter 46 over conductor 35 as indicated. The function of the comparator logic is to insure that the STVS is an actual signal supplied by the operator and not a spurious voltage signal caused by a random electrical disturbance. The relevant electrical code requires that the STVS exceed fifty percent of the system voltage to insure that the STVS is intentional.

Figure 3:
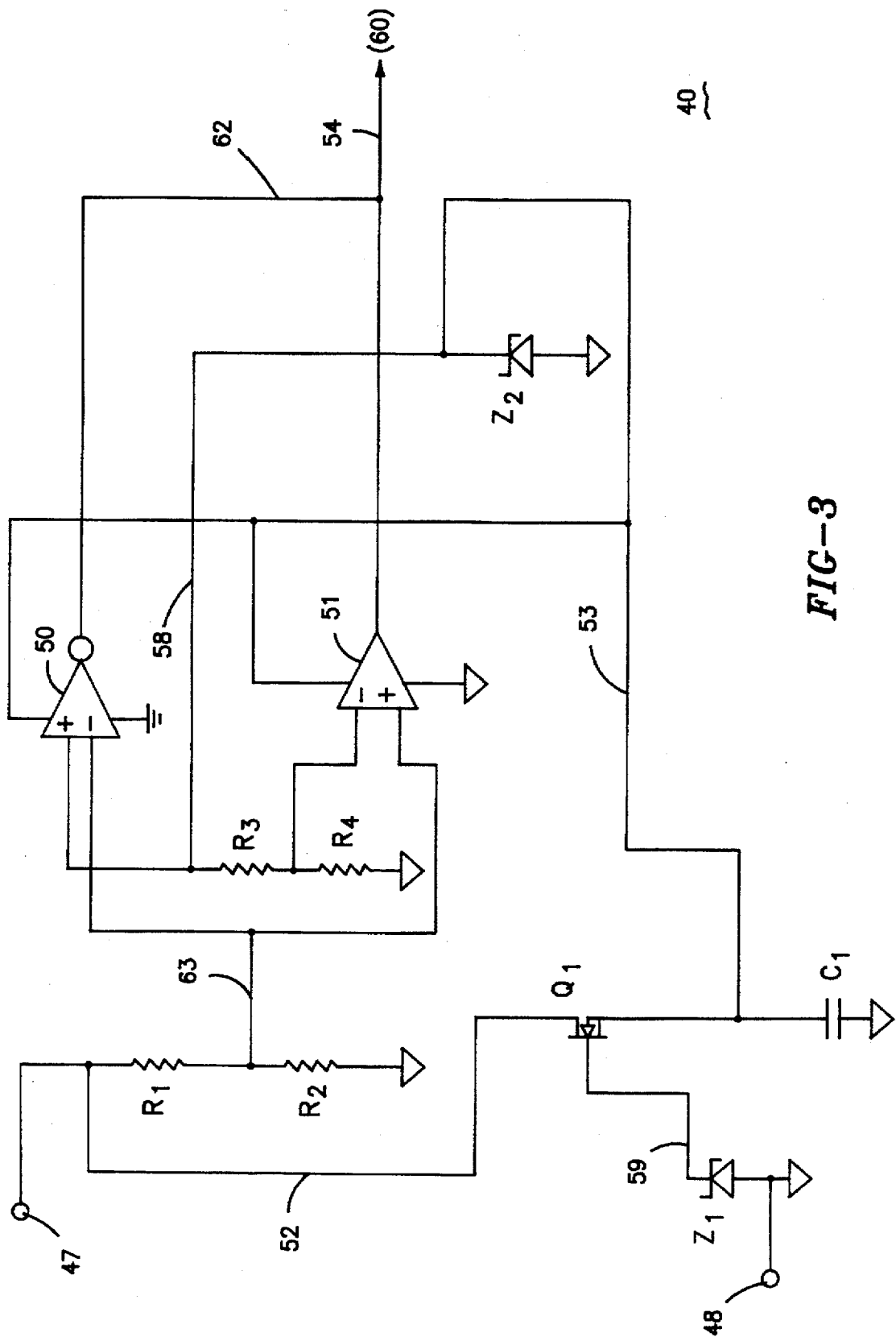
FIG. 3 is a schematic representation of the comparator circuit within the shunt trip module of FIG. 2.

The comparator 40 is shown in FIG. 3 with inputs 47, 48 receiving a shunt trip signal and transmitting the signal from terminal 47 through the voltage dividing resistors R1, R2 to one input of the inverter 50 and to one input of the comparator 51 over conductor 63. The signal is also transmitted from terminal 47 to one terminal of the FET Q1 over conductor 52. The signal is transmitted from terminal 48 to a first zener diode Z1, that is anode-to-gate connected with Q1 over conductor 59. The other terminal of Q1 is connected to a storage capacitor C1 which supplies operational power over conductor 53 to the inverter 50 and the comparator 51.

The other inputs to the inverter and the comparator are connected in common through the voltage dividing resistors R3, R4 and conductor 58, as indicated. The STVS reference voltage is supplied to the inputs as determined by a second zener diode Z2 which is anode-to-ground connected as a voltage regulator. The values of the storage capacitor and the second zener diode are selected to set the reference value at roughly half the voltage existing on the operators electrical distribution system. Voltage hysteresis is provided between the inverter and the comparator to insure that a temporary decrease in the signal does not interrupt the trip process. The output from the inverter and the comparator are transmitted over conductors 62 and 54 to the conditioning circuit 60 which includes the pulse generator circuit 42, transformer 43 and rectifier 44 as shown in FIG. 2. The output signal from the conditioner circuit 60 is directly inputted to the power supply 37 within the trip unit 10 over conductors 34,36 and is inputted to the microprocessor 30 through the inverter 46 over conductor 35 and to the output control 26 also over conductor 35 as described earlier with reference to FIG. 1.

Figure 4:
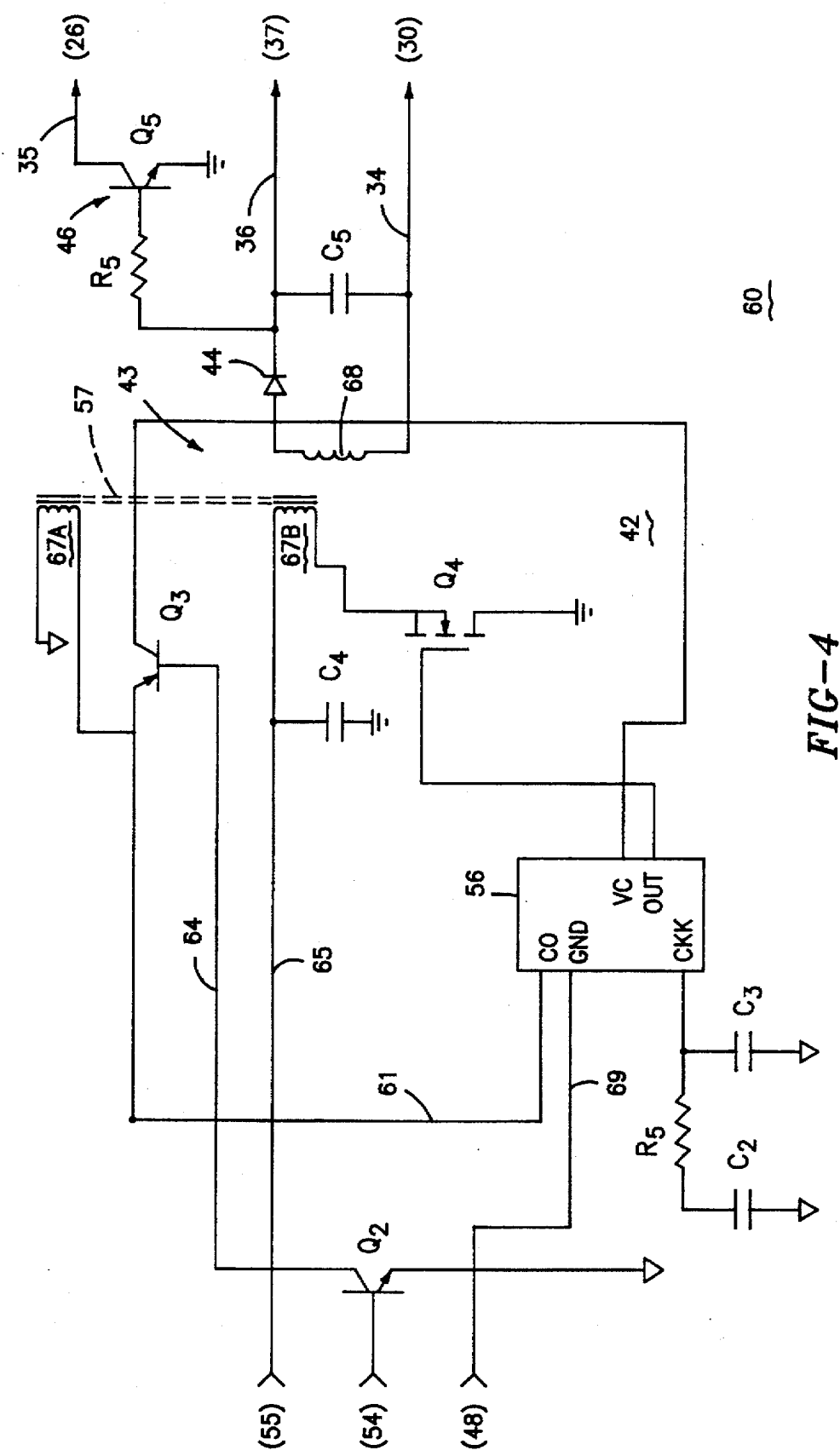
FIG. 4 is a schematic representation of pulse generator circuit within the shunt trip module of FIG. 2.

The output signal on conductor 54 as shown in FIG. 4 turns on switching transistor Q2 which is coupled to the gate of transistor Q3 by means of conductor 64. When Q2 turns on, Q3 turns on to enable current flow through a feed-back primary winding 67A on the core 57 of the dual primary transformer 43. The feed-back winding connects via conductor 61 with the COMP terminal of the pulse width modulation control unit 56 (PWM) which is a type 3843 supplied by Unitrode Co. The transformer 43 is a fly-back transformer which serves to increase the pulse frequency of the output signal from the comparator circuit up to 150 KC as well as to isolate the comparator circuit 40 of FIG. 2 from the trip unit circuit 10 shown in FIG. 1. The other primary winding 67B connects with the input 10 signal from the comparator circuit over conductor 65 and is coupled to ground by means of the filter capacitor C4 to remove any noise from the input signal prior to applying the signal to the primary winding 67B. The other terminal of the primary winding 67B connects back to the output terminal of the PWM control unit 56 through FET Q4 which is coupled to ground. The pulse frequency to the PWM unit is set by means of the timing circuit consisting of the capacitors C2, C3 which are interconnected by the timing resistor R5. The other input terminal 48 from the comparator circuit is connected to the GND terminal on the PWM unit by means of conductor 69. One side of the secondary winding 68 connects with the trip unit circuit through the rectifier diode 44 and the conductor 36. The same side of the secondary winding 68 connects with the trip unit circuit through the base drive resistor R5 of the inverter 46 which comprises an emitter-to-ground connected transistor Q5 and conductor 35. The other side of the secondary winding 68 connects with the trip unit circuit directly over conductor 34 which is coupled with conductor 36 by means of the filter capacitor C5.

The operation of the shunt trip module 33 can be best understood by referring collectively to the Figures wherein the STVS is impressed upon terminals 47, 48 and is compared to a reference value within the comparator circuit 40, as described earlier. The STVS is also examined to determine that the signal is an actual trip signal and not a spurious noise signal before transmitting to the conditioning circuit 60. The STVS is then increased to 100 KC within the pulse generator circuit 42 and is isolated from the trip unit circuit 10. The isolated STVS is then rectified by means of the rectifier 44 before transmitting to the power supply 37, microprocessor 30 and output control 26 within the trip unit circuit 10, for interrupting circuit current. The STVS is maintained to the trip unit circuit to provide operational power to the trip unit to allow the trip unit microprocessor to store and display the trip operation.

We claim:

1. An electronic trip unit having overcurrent and shunt trip unit circuit interruption comprising:

transformer means arranged for connection with an electrical distribution system;

a processor circuit connecting with said transformer means receiving sample current signals from said distribution system to determine the occurrence of an overcurrent condition;

trip initiating means connecting with said processor circuit for interrupting current transfer through said electrical distribution system;

power supply means within said processor circuit connecting with said transformer means and providing operational power to said processor circuit; and a shunt trip circuit connecting with said processor circuit and with a signal source, for comparing a shunt trip signal from said signal source to a reference value and outputting a trip command to said processor circuit when said shunt trip signal exceeds said reference value, said shunt trip circuit further includes a conditioner circuit connecting with said comparator circuit, said conditioner circuit including a pulse generator, a rectifier and a transformer, said transformer comprises a dual primary transformer, one primary being connected with said pulse generator in feed-back loop connection.

2. The electronic trip unit of claim 1 wherein said shunt trip circuit connects with said power supply means and providing operating power to said processor circuit when said transformer means are inactive.

3. The electronic trip unit of claim 1 further including a comparator circuit within said shunt trip circuit, said comparator circuit including a comparator and an inverter connected in common, said inverter outputting a control signal when said comparator has determined that said shunt trip signal exists beyond a predetermined time increment.

4. The electronic trip unit of claim 3 wherein said comparator circuit includes a storage capacitor supplying operating voltage to said comparator and said inverter.

5. The electronic trip unit of claim 1 wherein said rectifier comprises a diode.

6. The electronic trip unit of claim 1 wherein said pulse generator comprises a pulse width modulator.

7. The electronic trip unit of claim 6 including an RC timing circuit connected with said pulse width modulator providing a predetermined pulse frequency to said pulse width modulator.

8. The electronic trip unit of claim 1 wherein said feedback loop includes a pair of first and second transistor switches.

9. The electronic trip unit of claim 8 wherein said shunt trip signal is supplied to a gate of said first transistor switch and an anode of said first transistor switch is connected with a gate of said second transistor switch.

10. An electronic trip unit having overcurrent and shunt trip unit circuit interruption comprising:

transformer means arranged for connection with an electrical distribution system;

a processor circuit connecting with said transformer means receiving sample current signals from said distribution system to determine the occurrence of an overcurrent condition;

trip initiating means connecting with said processor circuit for interrupting current transfer through said electrical distribution system upon occurrence of an overcurrent condition;

power supply means within said processor circuit connecting with said transformer means and providing operational power to said processor circuit while said distribution system is uninterrupted; and a shunt trip circuit connecting with said processor circuit and with input terminals for comparing a voltage signal applied to said input terminals to a reference value and outputting a trip command to said processor circuit when said voltage signal exceeds said reference value to interrupt said distribution system and to provide operational power to said processor circuit after said distribution system becomes interrupted, said shunt trip circuit further includes a conditioner circuit connecting with said comparator circuit, said conditioner circuit including a pulse generator, a rectifier, and a transformer, said transformer comprises a dual primary transformer, one primary being connected with said pulse generator in feed-back loop connection.

11. The electronic trip unit of claim 10 further including a comparator circuit within said shunt trip circuit, said comparator circuit including a comparator and an inverter connected in common, said inverter outputting a control signal when said comparator has determined that said shunt trip signal exists beyond a predetermined time increment.

12. The electronic trip unit of claim 11 wherein said comparator circuit includes a storage capacitor supplying operating voltage to said comparator and said inverter.

13. The electronic trip unit of claim 10 wherein said rectifier comprises a diode.

14. The electronic trip unit of claim 10 wherein said pulse generator comprises a pulse width modulator.

15. The electronic trip unit of claim 14 including an RC timing circuit connected with said pulse width modulator providing a predetermined pulse frequency to said pulse width modulator.

16. The electronic trip unit of claim 10 wherein said feed-back loop includes a pair of first and second transistor switches.

17. The electronic trip unit of claim 16 wherein said shunt trip signal is supplied to a gate of said first transistor switch and an anode of said first transistor switch is connected with a gate of said second transistor switch.

* * * * *